(12) United States Patent
Schleicher

(10) Patent No.: US 10,576,545 B2
(45) Date of Patent: Mar. 3, 2020

(54) METHOD FOR PRODUCING A CUTTING TOOL, AND CUTTING TOOL

(71) Applicant: Kennametal Inc., Latrobe, PA (US)

(72) Inventor: Sebastian Schleicher, Fürth (DE)

(73) Assignee: KENNAMETAL INC., Latrobe, PA (US)

( * ) Notice: Subject to any disclaimer, the term of this patent is extended or adjusted under 35 U.S.C. 154(b) by 0 days.

(21) Appl. No.: 16/033,981

(22) Filed: Jul. 12, 2018

(65) Prior Publication Data

US 2019/0015903 A1 Jan. 17, 2019

(30) Foreign Application Priority Data

Jul. 12, 2017 (DE) .................. 10 2017 115 668

(51) Int. Cl.
*B23C 5/28* (2006.01)
*B23P 15/34* (2006.01)
*B22F 5/10* (2006.01)
*B33Y 80/00* (2015.01)
*B23Q 11/14* (2006.01)
*B23P 15/28* (2006.01)
(Continued)

(52) U.S. Cl.
CPC ................. *B22F 5/10* (2013.01); *B23C 5/28* (2013.01); *B23P 15/28* (2013.01); *B23P 15/34* (2013.01); *B23Q 11/141* (2013.01); *B33Y 80/00* (2014.12); *B22F 3/1055* (2013.01); *B22F 2003/1058* (2013.01); *B22F 2005/001* (2013.01); *B22F 2999/00* (2013.01); *B23C 2250/12* (2013.01); *B23C 2265/32* (2013.01)

(58) Field of Classification Search
CPC .. B22F 5/10; B22F 2005/001; B23C 2250/12; B23C 2265/32; B23C 5/28; B23P 15/28; B23P 15/34; B23Q 11/141; B23Q 11/10; B33Y 80/00; B23B 27/10; B23B 51/06; B23B 51/042
See application file for complete search history.

(56) References Cited

U.S. PATENT DOCUMENTS 522,588 A * 7/1894 Chouteau ............... B23Q 11/10
407/11
4,621,547 A * 11/1986 Yankoff ................ B23B 27/167
407/11
(Continued)

FOREIGN PATENT DOCUMENTS

DE         19942966 A1 *  3/2001  ............... B21K 5/04
DE     102015106374 A1 * 10/2016  ............... B23C 5/28
(Continued)

*Primary Examiner* — Sara Addisu
(74) *Attorney, Agent, or Firm* — Larry R. Meenan

(57) ABSTRACT

A method for producing a cutting tool is described. This method includes the production of a tool body of the cutting tool by means of a generative production method. At least one coolant cavity that has, at least in segments, an essentially triangular cross section is in this case provided in the tool body. Moreover, a cutting tool produced by means of this method is presented. Also proposed is a cutting tool having at least one coolant cavity running therein, wherein the coolant cavity has, at least in segments, an essentially triangular cross section and the cutting tool is produced, at least in segments, by means of a generative production method.

11 Claims, 2 Drawing Sheets

(51) Int. Cl.
*B22F 5/00* (2006.01)
*B22F 3/105* (2006.01)

(56) References Cited

U.S. PATENT DOCUMENTS

| | | | | |
|---|---|---|---|---|
| 4,813,823 | A * | 3/1989 | Bieneck | B21C 23/147 408/144 |
| 4,826,364 | A * | 5/1989 | Grunsky | B23B 51/06 408/59 |
| 6,045,300 | A * | 4/2000 | Antoun | B23B 27/10 407/11 |
| 6,447,218 | B1 * | 9/2002 | Lagerberg | B23B 27/10 407/114 |
| 6,699,430 | B2 * | 3/2004 | Friedrichs | B21K 5/04 264/629 |
| 2003/0082018 | A1 * | 5/2003 | Kraemer | B23B 27/10 407/11 |
| 2004/0240949 | A1 * | 12/2004 | Pachao-Morbitzer | B23B 27/065 407/11 |
| 2005/0244235 | A1 * | 11/2005 | Kleiner | B23B 51/06 408/59 |
| 2006/0006576 | A1 * | 1/2006 | Karos | B21C 23/147 264/209.2 |
| 2006/0140728 | A1 * | 6/2006 | Giannetti | B23B 27/10 407/11 |
| 2010/0254772 | A1 * | 10/2010 | Rozzi | B23B 27/10 407/11 |
| 2011/0076105 | A1 * | 3/2011 | Hideta | B23B 27/12 407/11 |
| 2011/0305531 | A1 * | 12/2011 | Amstibovitsky | B23B 27/10 407/11 |
| 2012/0082518 | A1 * | 4/2012 | Woodruff | B23C 5/109 407/11 |
| 2012/0082524 | A1 * | 4/2012 | Matsuda | B23B 51/06 408/59 |
| 2012/0163931 | A1 * | 6/2012 | Friedrichs | B23B 51/06 408/57 |
| 2015/0321267 | A1 * | 11/2015 | Takai | B23B 51/06 408/59 |
| 2016/0031016 | A1 * | 2/2016 | Takai | B23B 51/06 408/57 |
| 2016/0059323 | A1 * | 3/2016 | Riester | B23B 51/06 408/57 |
| 2019/0105712 | A1 * | 4/2019 | Kamitani | B33Y 40/00 |
| 2019/0143423 | A1 * | 5/2019 | Nakata | B23B 51/06 |

FOREIGN PATENT DOCUMENTS

| | | | | |
|---|---|---|---|---|
| EP | | 0123387 A1 * | 10/1984 | ......... B23B 27/167 |
| EP | | 2298480 A1 * | 3/2011 | ............. B23C 5/10 |
| JP | | 2011020255 A * | 2/2011 | ........... B23B 51/06 |

* cited by examiner

METHOD FOR PRODUCING A CUTTING TOOL, AND CUTTING TOOL

RELATED APPLICATION DATA

The present application claims priority pursuant to 35 U.S.C. § 119(a) to German Patent Application No. 102017115668.2 filed Jul. 12, 2017, which is incorporated herein by reference in its entirety.

FIELD

The invention relates to a method for producing a cutting tool, in particular a drilling or milling tool. The invention additionally relates to a cutting tool produced by means of such a method. The invention additionally relates to a cutting tool, in particular a drilling or milling tool, with at least one coolant cavity running therein.

BACKGROUND

Cutting tools with coolant cavities, as well as associated production methods, are in this respect known from the prior art.

The coolant cavities are normally introduced into cutting tools in order to cool a machining zone, and thus the cutting tool itself. The service life of a cutting tool may be increased in this way. At the same time, greater rates of material removal are enabled. A cutting tool may thus be operated more efficiently by means of a coolant cavity.

In the production methods for cutting tools, it is typically sought to design them to be optimally simple and cost-effective.

Moreover, the production method also influences the machining properties of a cutting tool via the associated boundary conditions with regard to the manufacturable geometries and processable materials.

SUMMARY

It is the object of the invention to specify a method of the aforementioned type with which cutting tools with good machining properties may be produced in a simple and cost-effective manner. Moreover, the object of the invention is to specify such cutting tools.

The object is achieved by a method of the aforementioned type, comprising the following step:

producing a tool body of the cutting tool by means of a generative production method, wherein at least one coolant cavity is provided in the tool body, and the coolant cavity has, at least in segments, an essentially triangular cross section.

The specification "essentially triangular" is in this respect to be understood broadly. All conceivable triangular shapes are encompassed by this term, thus not only equilateral or isosceles triangles. Moreover, shapes whose edges are irregular, wavy, notched and/or frayed are also encompassed. The same applies to triangular shapes with rounded corners.

The production of a cutting tool by means of a generative production method offers the advantage of being able to produce almost any geometries. In some embodiments, generative production methods include one or more additive manufacturing techniques, such as selective laser sintering, selective laser melting and/or binder jetting combined with sintering and/or hot isostatic pressing (HIP). Geometric limitations of the production capability that, for example, exist in machining production methods are essentially removed. This applies in particular to the production of undercuts and complex geometries. Materials that can be machined only at great expenditure may also be processed by means of generative production methods. Moreover, with generative production methods, cutting tools can be economically produced in small lot sizes, in the extreme case in a lot size of one. Among other things, this is due to the fact that generative production methods normally run automatically. Consequently, cutting tools may be produced with such production methods simply and cost-effectively. At the same time, tools can be produced in this way such that they have good machining properties. In particular, geometries of coolant cavities can be produced that cannot be produced, or can be produced only with large expenditure, by means of machining production methods. Among these are also coolant cavities having essentially triangular cross sections.

According to one embodiment, a segment of the coolant cavity with an essentially triangular cross section is produced without a support structure. Support structures are common in generative production methods when voids or cavities are produced. The support structures are normally removed again, for example by being washed away, from the produced component after the end of the generative production process. However, it cannot thereby be precluded that parts of the support structure undesirably remain in the component. This typically occurs at locations within the component that are especially difficult to access. On the one hand, the material for the support structures is saved in the manufacturing process as a result of a production without support structure. A time savings, i.e. a faster production, thus also results. All work steps that relate to the removal of support structures may also be dispensed with. The problem of an unwanted retention of parts of support structures in the component is thereby basically eliminated. The production method is thus simplified and accelerated in comparison to known methods that use support structures. It is thereby also improved with regard to the costs.

In the production of the cutting tool, at least one overhanging wall, preferably all overhanging walls, of the coolant cavity may have an overhang angle measured relatively to a horizontal, which overhang angle is greater than an overhang limit angle. In this respect, "in the production" in particular means the position and orientation of the cutting tool during the production. What is to be understood by an overhanging wall is a wall that is not vertical but rather inclined in space. It then forms an overhang relative to a space which is bounded by the wall and toward which the wall is inclined. This is characterized in that a plumb bob dropped from an arbitrary point of the wall in the direction of the floor always meets the floor with a clearance from the wall. The overhang angle is in this case measured such that an angle of 90° corresponds to a vertical. The overhang limit angle is in this case to be understood as the angle below which a wall may be produced only with the aid of a support structure. The overhang limit angle is in this case dependent on the employed generative production method and on the processed material, among other things. The overhang limit angle is 30° to 70°, preferably 40° to 60°. When all walls comply with the predetermined overhang angle, the entire component may be produced without support structures. The aforementioned advantages then appear to an especially high degree.

In one development, the coolant cavity is a coolant conduit, wherein the coolant conduit has an essentially triangular cross section along its entire extent. The coolant cavity may thus be produced especially simply, and in particular without support structure. Moreover, such a coolant conduit may also be moved particularly closely to interfaces of the cutting tool that require an especially efficient heat dissipation. A cutting tool having especially good machining properties thereby results.

Moreover, the object is achieved by a cutting tool, in particular a drilling or milling tool, that is produced by means of a method according to the invention. Such a cutting tool may be efficiently cooled via the incorporated coolant cavities. As a result, a high rate of material removal may be realized with this cutting tool. The supply of coolant may in this case in principle not be prevented by residues of a support structure. In addition, the coolant cavities may be arranged closely to locations of the cutting tool that are to be cooled. A long service life of the cutting tool can thus also be ensured. Overall, such a cutting tool thus has especially good machining properties.

The object is further achieved by a cutting tool, in particular a drilling or milling tool, of the aforementioned type in which the coolant cavity has, at least in segments, an essentially triangular cross section and the cutting tool is produced, at least in segments, by means of a generative production method. The entire cutting tool may in this case also be produced by means of a generative production process. The effects and advantages already mentioned above result.

In the production orientation of the cutting tool, at least one overhanging wall, preferably all overhanging walls, of the coolant cavity may have an overhang angle measured relatively to a horizontal, which overhang angle is greater than an overhang limit angle. In this respect, "production orientation" is to be understood as the orientation of the cutting tool that it assumes during its production. In the process, a rotation axis of the cutting tool is preferably oriented horizontally in space. From the perspective of the generative production method, the rotation axis is advantageously situated parallelly to the layer structure planes.

According to one variant, the coolant cavity is a coolant conduit, wherein the coolant conduit has an essentially triangular cross section along its entire extent.

BRIEF DESCRIPTION OF THE DRAWINGS

The invention is explained below with reference to various embodiments which are shown in the accompanying drawings. In the figures.

DETAILED DESCRIPTION

Figure 1:
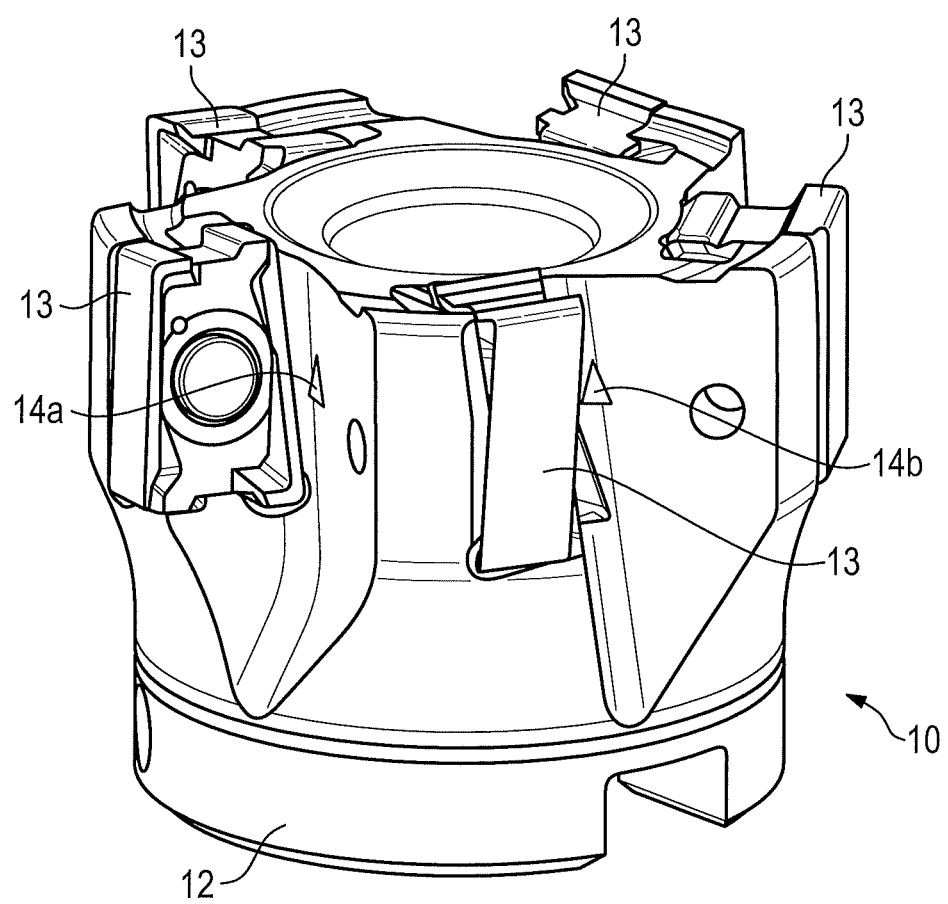
FIG. 1 a cutting tool according to the invention that is produced by means of a method according to the invention, in a perspective view, FIG. 2 schematic cross section shapes of a coolant cavity of a cutting tool according to the invention, in various embodiments, and FIG. 3 for comparison, a circular cross section of a known coolant cavity.

FIG. 1 shows a cutting tool 10 that is a milling tool in the embodiment shown. It might just as well be a drilling tool (not shown here). The following statements thus apply to both drilling and milling tools.

A tool body 12 of the cutting tool 10 is produced by means of a generative production method.

Attached to the tool body are additional cutting inserts 13 that may likewise be produced by means of a generative production method. However, the production of the cutting inserts 13 is not important in this case.

Alternatively, the cutting tool 10 may also be realized in one part. The cutting edges are then manufactured in one piece with the tool body 12. The cutting tool 10 is then consequently produced overall by means of a generative production method.

Multiple coolant cavities are in this case provided in the tool body 12, of which coolant cavities 14a, 14b are visible in FIG. 1. Both are formed as coolant conduits and have an essentially triangular cross section along their entire extent.

The coolant cavities 14a, 14b serve to supply a machining zone with coolant or cooling lubricant.

Figure 2:
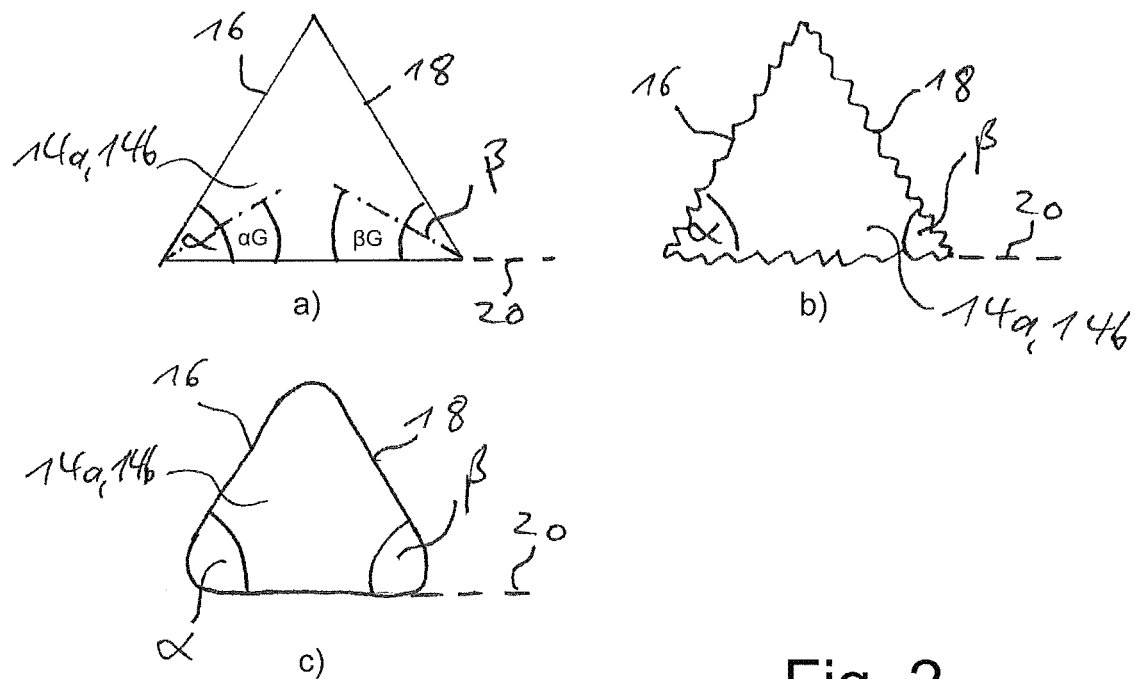

Shown in FIG. 2 are examples of cross sections of the coolant cavities 14a, 14b.

The cross sections are in this case oriented as they may be situated in space in the production of the associated cutting tool 10 by means of a generative production method. The cross sections, or more generally speaking the cutting tool 10, are thus depicted in the production orientation. In the depicted embodiment, a rotation axis of the cutting tool 10 is vertically aligned for this purpose. It is also situated orthogonally to the layer planes of the generative production method.

Other production orientations are of course also possible. However, the selected orientation allows a particularly simple explanation.

The cross sections have two respective walls 16, 18 overhanging relatively to the coolant cavity 14a, 14b.

In this case, the overhanging wall 16 has an overhang angle $\alpha$ relative to a horizontal 20 and the overhanging wall 18 has an overhang angle $\beta$ relative to the horizontal 20. The overhang angles $\alpha$, $\beta$ are in this case always measured in the direction of the overhang, thus in the direction of the coolant cavity 14a, 14b. Moreover, a tangent is always placed on the contour of the wall 16, 18 in order to measure the overhang angle (see also FIG. 3).

In the embodiments shown, the overhang angles $\alpha$, $\beta$ are always greater than an associated overhang limit angle $\alpha_G$, $\beta_G$, which is presently drawn only by way of example in FIG. 2 a). The same applies to FIGS. 2 b) and 2 c).

Figure 3:
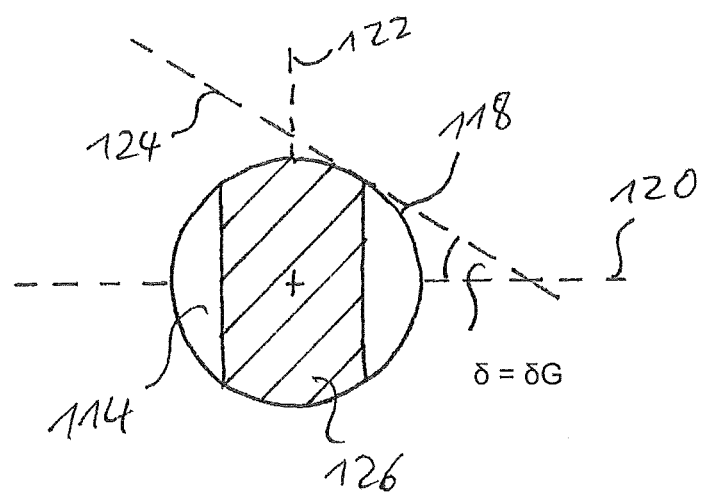

The overhang limit angles $\alpha_G$, $\beta_G$ may be explained using a circular coolant cavity 114 shown in FIG. 3.

Only one overhanging wall segment 118 of the coolant cavity 114 is in this case considered. This wall segment 118 is bounded by a horizontal 120 and a vertical 122. It thus corresponds to a circular arc sweeping across 90° and has an overhang angle $\delta$.

The latter decreases in the course of the overhanging wall segment 118 starting from the horizontal 120, in the region of which it amounts to approximately 90°, to approximately 0°, which it reaches in the region of the vertical 122.

In the depiction shown, a line 124 symbolizes an overhang limit angle $\delta_G$.

As long as the overhang angle $\delta$ is greater than the overhang limit angle $\delta_G$, the coolant cavity 114 may be manufactured without a support structure 126. A support structure 126 is necessary only in the region of the coolant cavity 114 in which the overhang angle $\delta$ is less than the overhang limit angle $\delta_G$.

Returning to the coolant cavities 14a, 14b of the cutting tool 10 shown in FIGS. 1 and 2, it is thus clear why they are produced without support structure. In other words, the coolant cavities 14a, 14b are produced without using a support structure.

The invention claimed is:

1. A cutting tool having at least one coolant cavity running therein, wherein the coolant cavity has, at least in segments, an essentially triangular cross section, characterized in that, in a production orientation of the cutting tool, at least one overhanging wall of the coolant cavity has an overhang angle, measured relatively to a horizontal, that is greater than an overhang limit angle.

2. The cutting tool according to claim 1, characterized in that the coolant cavity is a coolant conduit, wherein the coolant conduit has an essentially triangular cross section along its entire extent.

3. The cutting tool according to claim 1, characterized in that the cutting tool is a drilling tool.

4. The cutting tool according to claim 1, wherein the cutting tool is a milling tool.

5. The cutting tool according to claim 1, wherein the cutting tool, at least in segments, is produced by means of a generative production method.

6. The cutting tool according to claim 1, wherein the coolant cavity comprises an exit aperture in a sidewall of the cutting tool.

7. The cutting tool according to claim 1, wherein the coolant cavity comprises two overhanging walls, the overhang angle of each wall greater than the overhang limit angle.

8. The cutting tool of claim 1, wherein the overhang limit angle is 30° to 70°.

9. The cutting tool of claim 1, wherein the overhang limit angle is 60°.

10. The cutting tool of claim 1, wherein the overhang limit angle is 70°.

11. The cutting tool of claim 6, wherein the exit aperture is forward of a cutting insert in a direction of rotation of the cutting tool.

\* \* \* \* \*